INVENTORS.
HARRIS B. BREMER
EUGENE G. LANE
GERALD M. PETERSON
JOHN W. SCOTT
BY
Reynolds, Beach & Christensen
ATTORNEYS Nov. 19, 1957 H. B. BREMER ET AL 2,813,692
SEALED BULKHEAD INSTALLATIONS OF ELECTRIC WIRES
Filed May 28, 1954 2 Sheets-Sheet 2
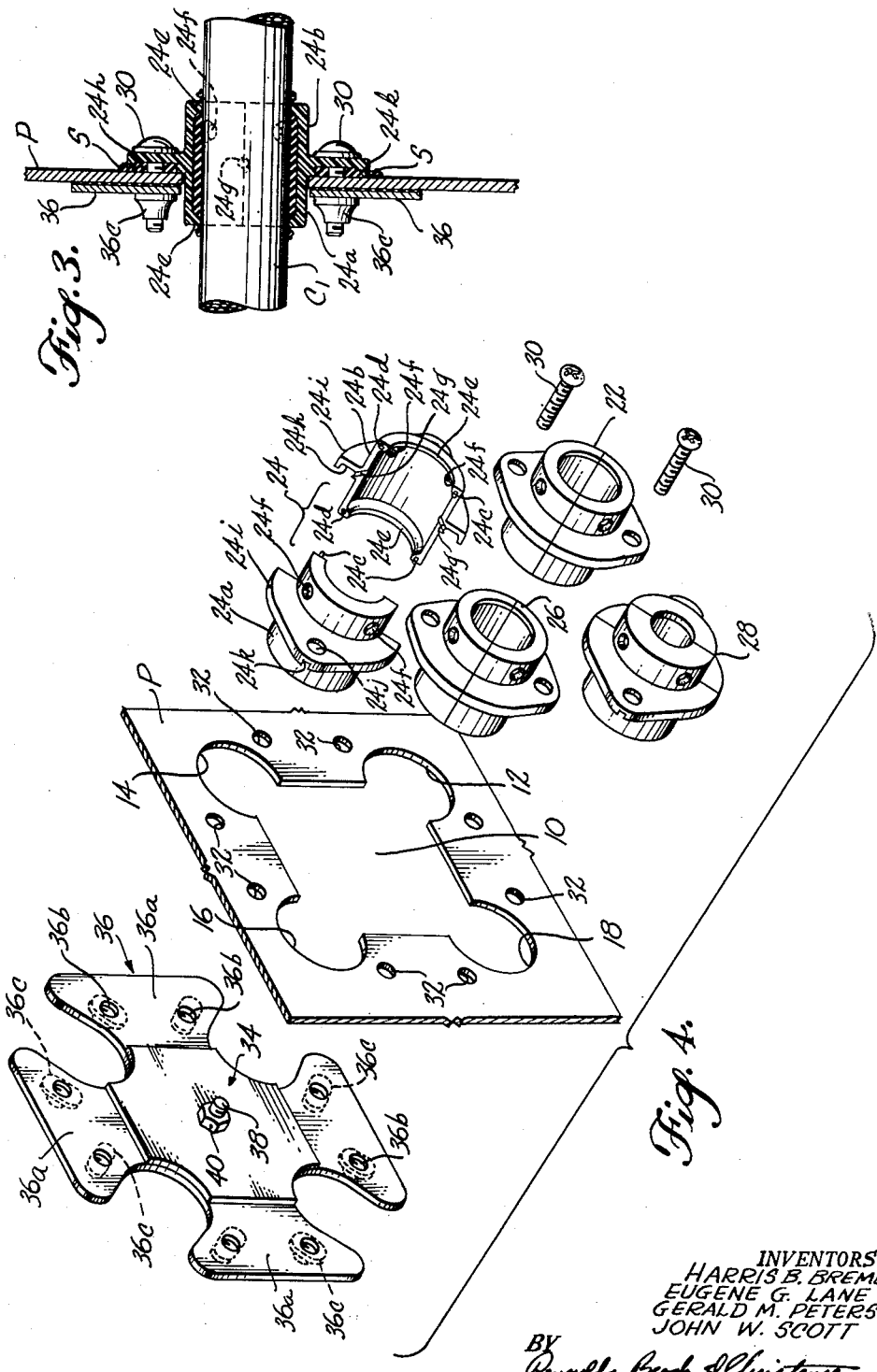
INVENTORS.
HARRIS B. BREMER
EUGENE G. LANE
GERALD M. PETERSON
JOHN W. SCOTT
BY
ATTORNEYS United States Patent Office 2,813,692
Patented Nov. 19, 1957

2,813,692

SEALED BULKHEAD INSTALLATIONS OF ELECTRIC WIRES

Harris B. Bremer, Eugene G. Lane, and John W. Scott, Seattle, and Gerald M. Peterson, Mercer Island, Wash., assignors to Boeing Airplane Company, Seattle, Wash., a corporation of Delaware Application May 28, 1954, Serial No. 433,202

7 Claims. (Cl. 248—56)

This invention relates to a means by which elongated members, and more especially a group or bundle of such members, may be removably installed extending transversely through a pressure bulkhead, fluid container wall or other solid or impervious partition in a manner preventing leakage of fluid past the members at the joint. The invention is herein illustratively described by reference to its presently preferred form as applied to the running of electric cables through airplane pressure cabin walls or fuel tank walls; however, it will be evident to those skilled in the art that the details of construction may vary within the scope of the invention.

The cabins of passenger and military aircraft are pressurized to permit flight at high elevations. When flying at 25,000 feet elevation in such airplanes there will be a pressure differential of several pounds per square inch as between opposite sides of the pressure bulkheads. It is therefore important to carefully seal all windows and hatches, and service openings in the cabin walls and bulkheads through which any structural or control elements such as electric cables may pass. The installation of electric cables has presented unusual difficulties because of the problem of maintenance and testing of electric circuits after installation making it highly desirable to provide a sealed joint the components of which can be removed, if necessary, to withdraw, inspect and repair the cables. Similar problems exist in conjunction with extending electric cables through bulkheads of fuel tanks or chambers containing fuel vapors.

It is very desirable in most cases to bundle together related multiwire cables and fit them with connectors in the electrical shops of the airplane manufacturer at the same time the airplane structure to receive the wiring is being separately built. In this type of practice it is essential for installation purposes that any pressure bulkhead through which the bundle of cables must pass be provided with an insertion opening which is initially large enough to pass the bundle and the electrical connectors carried by individual cables, whereupon the opening is closed, the bulkhead sealed around the cables, and the electrical circuits completed by engaging the cable connectors with mating connectors on continuations of the installed cables. Preferably connectors are provided on the bulkhead-intersecting cables adjacent only one side of the bulkhead, namely the pressure side thereof. This minimizes the number of wire joints or connections and in that manner reduces the possibility of electric circuit breaks, simplifies and reduces the cost of wiring, and reduces the possible danger of electric arcs occurring between connector contacts. By avoiding use of connectors on the second side of the bulkhead where there may be combustible vapors or liquids, or air at low pressure conducive to ionization the factors of safety are considerably promoted.

The present invention is directed generally to the provision of means achieving the above objectives.

Another object of the invention is such a means which may be made in a form readily installed, removed and reinstalled solely from one side of the bulkhead if desired. In some installations there is insufficient space on the second side of the bulkhead to work, and even in those situations wherein there is accessible space it may still be necessary to perform testing or repairs of wiring requiring removal of cables under emergency conditions precluding human entry into the space behind the bulkhead. Still another object of the invention is the provision of means of the type described capable of resisting relatively high differential pressures on opposite sides of the bulkhead, and of being reliably sealed by means permitting introduction of sealant compound in and around interfaces.

Still another object is a device of the type described which will hold the electric cables tightly to prevent chafing and wearing of wire insulation, which will be light in weight and relatively simple in construction and installation.

In carrying out the invention the bulkhead or other membranous partition is provided with a main opening of a size permitting insertion of the bundle of cables with connectors through such opening. The cables in the bundle are then spread apart laterally at the partition and thereby lodged in individual recesses in the corners or sides of said insertion opening. The complemental segments of tubular cable-encircling grommets are assembled around each individual cable and inserted into the respective recesses to protect the cable sheaths from the relatively sharp partition recess edges. These grommets also serve as sealant retainers, as will hereinafter be more fully explained. A cover plate carrying a plug or closure plate for the main insertion opening is next applied. This cover plate overlaps the membranous partition at locations situated between the recesses in the latter, and its edges along with those of the closure plate are recessed complementally to the side recesses of the membranous partition for completing the retentive encirclement of each grommeted cable. Suitable sealing compound is interposed preferably between the cover plate and closure plate and between these members and the areas on the partition overlapped and adjoined thereby, so that when the cover plate is finally secured in place there will be an effective seal between the various interfaces. Preferably the segmented tubular grommets have annular flanges thereon by which the same are connected directly to the partition by the same fastener screws as those connecting the cover plate to the partition. The ends of each grommet are internally constricted to hold sealant in the annular space therebetween surrounding the cable, and the securing flanges contacting the membranous partition are likewise grooved for reception of sealant therebetween, said tubular grommets having sealant injection openings for injection of sealing compound into such spaces and grooves.

These and other features, objects and advantages of the invention will become more fully evident from the following description by reference to the accompanying drawings.

Figure 3 is a sectional view taken on line 3—3 in Figure 2.

Figure 4 is an exploded view of the means forming the cable mount as seen in perspective.

Figure 1:
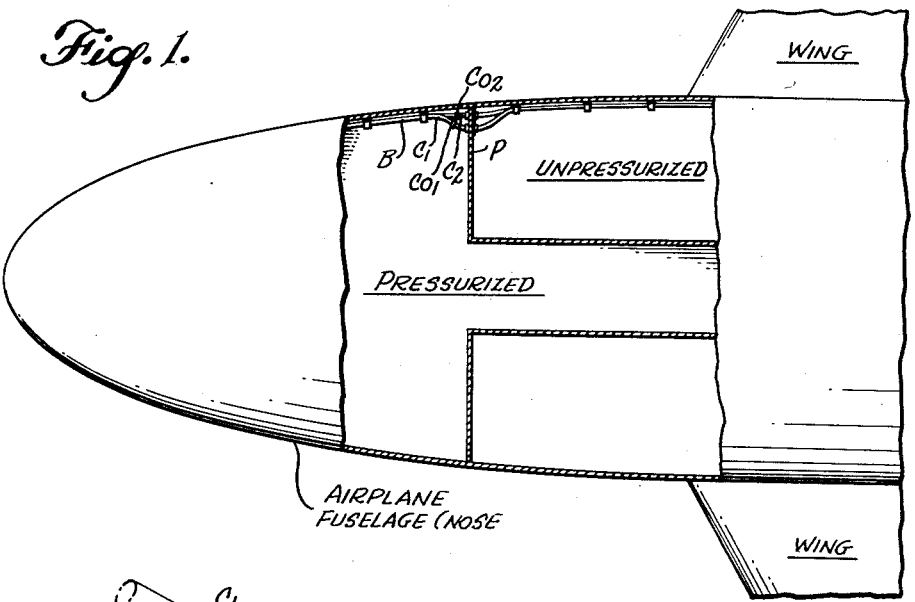
Figure 1 is a simplified plan view of the forward end portion of an airplane fuselage with parts broken away to illustrate a typical installation embodying the invention.

Referring now to the drawings, the membranous partition P through which the bundle of cables B must extend along the airplane fuselage wall forms a dividing wall or bulkhead between the pressurized nose cabin and an unpressurized compartment in the airplane. As mentioned above, one phase of the present problem is to provide a suitable mounting for the individual cables in the bundle which will permit the same to be installed in the airplane grouped together as a bundle and yet provide a pressure seal around the cables at their intersection with the partition P. Furthermore, it is desirable for convenience in the installation and maintenance of the wiring to provide each individual cable (which may have a multiplicity of wires within it) with severable electric connectors preferably located in the pressurized cabin of the airplane and avoid such connectors in the unpressurized compartment for reasons previously described. In the example, cable $C_1$ has a severable connector $Co_1$ and the other cables having similar connectors; the bundle of cables is made up of four individual cables, three of which are similar and the fourth is somewhat smaller in diameter. It will be understood that the number and sizes of cables making up the bundle may vary without changing the application of principles of the invention.

The partition P comprising the web of the pressure bulkhead is normally formed of a sheet of aluminum alloy. For purposes of the invention an opening 10 is cut in this partition at the desired location and of a size to permit inserting the bundle of cables with connectors through the partition. Preferably the insertion opening 10 is made no larger than necessary in order to accomplish this result. In the example the opening 10 is preferably square or rectangular and in the four corners thereof, or at other peripherally spaced locations therearound, recesses 12, 14, 16 and 18 are formed, as illustrated in Figure 4. The entrances leading into each such recess from the insertion opening 10 are of sufficient width to pass the individual cables into such recesses by spreading movement of the bundled cables laterally of themselves.

The individual cables lodged in the respective recesses 12, 14, 16 and 18 are held out of contact with the relatively sharp edges of the recesses by means of cable-encircling segmented tubular grommets 22, 24, 26 and 28 respectively, which fit snugly into such recesses partially encircled thereby. Except for variations in diameter, which depend upon individual cable size, the individual grommets are of similar form. A description of one will serve for all.

The grommet 24 comprises the two semi-circular segments 24a and 24b preferably formed of Nylon or other tough, hard electrical insulating material. The complementally formed segments have interfitting locating pins 24c and sockets 24d which hold the segments in their assembled position encircling a cable. The segments carry grommet-mounting flange segments 24i projecting laterally therefrom intermediate the ends of the grommet. Each such flange segment has a securing aperture 24j for reception of a mounting bolt as will appear. The ends of the segments 24a and 24b have inwardly projecting beads or flanges 24e extending therearound defining an annular space therebetween surrounding the cable.

Preferably each such segment has one or more sealant injection openings 24f through which sealant compound, such as a plasticizing elastomer, is injected into the annular space surrounding the cable to form a durable sealed joint therewith. Each segment has an inclined groove 24g in its end face which registers with that of the opposing segment on assembly to form an opening 24g which leads outwardly from the above-mentioned annular space into a groove 24h formed in one side of the generally annular securing flanges 24i, as illustrated. Thus when sealant under pressure fills the annular space between end constrictions 24e surrounding the cable, it flows radially outwardly through passages 24g into the groove 24h to form a seal between the securing flanges 24i and the face of the partition P contacted thereby in the assembled position of the components (Figure 3). In filling this groove the sealant necessarily flows around the securing aperture 24j formed in the base of groove 24h. Also when the opening 24g is filled, leakage along the interfaces between grommet segments is blocked by the sealant.

Figure 2:
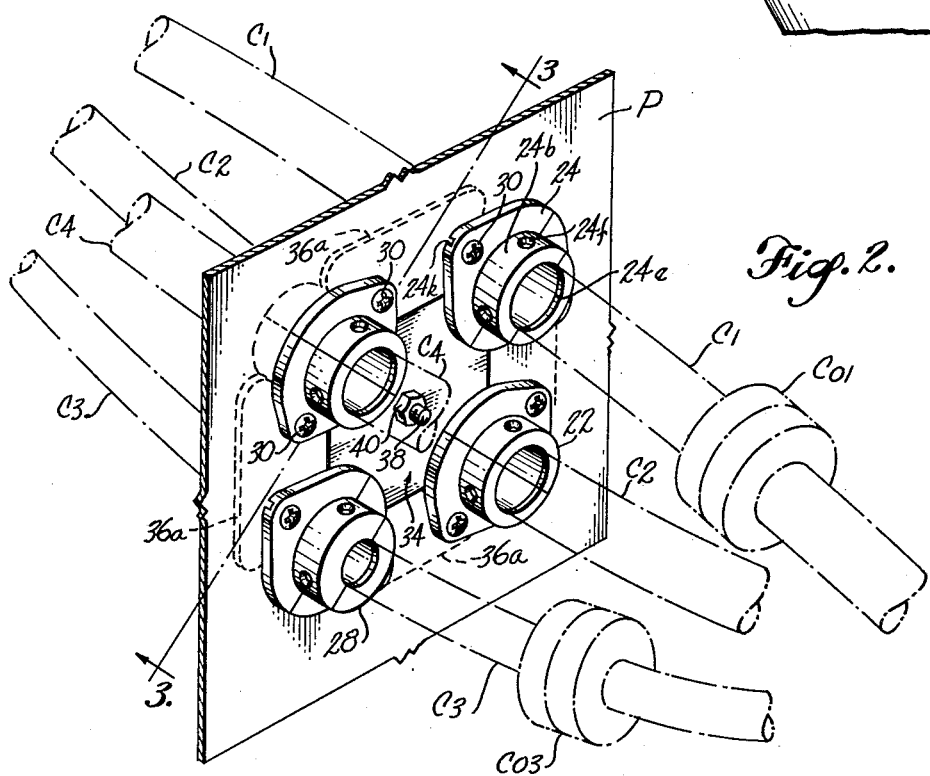
Figure 2 is a perspective view of a completed installation, the cables being shown in broken lines for clarity of illustration.

There is further provided a closure plate or plug member 34 which fits into the insertion opening 10 in the partition and is preferably formed of sheet metal of the same gauge as the partition itself so that a flush surface joint is achieved on the side of the bulkhead facing the installing technician. A cover plate 36 is secured to the opposite side of the closure plate 34 by the screw 38 and nut 40. The cover plate 36 in the illustration at hand is preferably in the form of a Formee cross, having arms or edgewise extensions 36a which assume an overlapping relationship with portions of the membranous partition P lying generally between corner recesses 12, 14, 16 and 18 formed therein. Both the cover plate and the closure plate are recessed at the corners complementally to the recesses 12, 14, 16 and 18, respectively, and their recess edges bear outwardly against the inner sides of the assembled grommets 22, 24, 26 and 28, respectively, when the latter have been inserted into the latter recesses (Figure 2). Thus the cover plate and closure plate have recesses the edges of which complete the encirclement of the respective tubular grommets.

Securing apertures 36b formed in the cover plate securing flaps 36a lie in registry with the securing apertures 32 in the partition when the parts have been assembled as in Figure 2. Nut plates 36c fastened to the outer side of the cover plate 36, i. e. the side opposite the closure plate 34, are located in registry with the apertures 36b and serve to receive machine screws 30 when the latter are passed through the apertures 24j in the segmented grommet flanges and the aligned apertures 32 in the partition P.

In making the installation, after the insertion opening 10 with recesses 12, 14, 16 and 18 has been cut in the web of the pressure bulkhead P (i. e. the partition) and the several securing apertures 32 drilled at the correct locations, the bundle of cables is passed through the opening 10 and the individual segmented tubular grommets 22, 24, 26 and 28 are assembled around their respective cables C2, C1, C4 and C3. The preassembled cover and closure plates are placed between the spread-apart cables which lie in their recesses on the back side of the partition P. The grommet flanges are oriented with their securing apertures 24j approximately in position to fall into registry with the corresponding securing apertures 32 in the partition when these flanges are slid into their respective retaining recesses in the partition. The closure plate 34 is then drawn into the insertion opening 10 and the flaps of the cover plate 36 will overlap the membranous partition generally between successive recesses. Securing screws 30 are then inserted through the securing apertures 24j, the underlying apertures 32 in the partition P, the cover plate apertures 36b and are threaded into the nut plates 36c and tightened to clamp the parts securely together as shown in Figure 3. The dividing line between segments of each grommet will extend generally along the diagonal line of the insertion opening 10 which line passes through the recess containing the particular grommet as shown in Figure 2.

With the parts thus assembled, sealant compound S under pressure is injected through the injection openings 24f and into the annular spaces within the grommets surrounding the cables to fill out such spaces and to flow outwardly through openings 24g into the sealant compound grooves 24h in the securing flanges 24i. Thus the sealing compound flows around the shanks of the securing screws 30 and along all interfaces between the parts of each grommet and between such parts and the adjoining metal plates including the partition P. When sealing compound emerges through the notches 24k in the tips of the securing flanges 24i the technician is assured that the seal has been completed. Before assembly of the parts similar sealant is wiped onto the surfaces between the cover plate and closure plate and between the cover plate surfaces and edges and those of the closure plate and the partition where a seal is required. When the installation is otherwise complete it is desirable in practice to lay a bead of sealant over the exposed cracks between edges of opening 10 and filler plate 34, i. e. between grommets, for good measure in attaining a pressure tight seal.

If for any reason it becomes necessary to remove the cables from the partition for repair or test purposes, it is only necessary to remove the machine screws 30, whereupon the segmented grommets may be removed as may the cover plate and closure plate. By disconnecting the cables at the severable connectors $Co_1$, $Co_2$, etc., the entire cable bundle may be withdrawn from the partition through the opening 10 as desired.

It will of course be appreciated that various aids to the installation of the joint components may be used, including applications of masking tape to hold the parts in convenient intermediate or preliminary positions pending completion of other steps in the assembly operations.

These and other aspects of the invention will be apparent to those skilled in the art who will realize that certain changes and modifications with respect to details may be made without departing from the essential features involved.

The term "cable" as herein used is intended to have a broad connotation alternatively embracing individual wires, groups or bundles of individual wires separately insulated from each other or not, and even a plurality of such wire groups or bundles. It is not necessary within the meaning of the above definition, for example, that in the case of multiple wires or multiple groups of wires making up a "cable" there be a sheath or wrapping around the wires or wire groups. The inventive principles will apply regardless of the nature of the "cable" received in a single grommet.

We claim as our invention:

1. Means for removably mounting in a solid sheet partition electric cables extending transversely through said partition, said means comprising the partition itself, said partition having a central working opening therein of a size to permit inserting and removing such cables, and further having recesses joined with said central working opening of a number and of individual sizes, smaller than said central opening, to receive and partially encircle the respective cables, segmented tubular members removably inserted in said individual recesses adapted for encircling the respective cables and thereby separating said cables from the edges of the associated recesses, closure plate means fitted to and removably received in said working opening, said closure plate means having edge recesses of sizes and peripheral locations respectively complemental to said partition recesses, cover plate means secured to one face of said closure plate means, said cover plate means having securing portions extending edgewise therefrom into overlapping relationship with said partition at locations between recesses therein, and fastener means removably securing said cover plate means directly to the portions of said partition overlapped thereby.

2. The removable mounting means defined in claim 1, wherein the segments of the segmented tubular members have securing elements projecting laterally therefrom into overlapping relationship with the cover plate member securing portions, and wherein the fastener means extend through said securing elements for holding said segmented tubular members directly to the partition.

3. The removable mounting means defined in claim 2, wherein the segmented tubular members have internally constricted end portions defining therebetween an annular space surrounding the cable received in each such segmented tubular member, said tubular members having sealant injection openings in the respective walls thereof communicating with said annular spaces for injection of sealant compound into such spaces.

4. The removable mounting means defined in claim 2, wherein the segmented tubular members are formed in two segments each having a securing element projecting laterally therefrom generally oppositely from the securing element of the complemental segment in the assembled relationship of such segments.

5. Means removably mounting in a sheet partition electric cables extending transversely through said partition, said means comprising the partition itself, said partition having a working opening therein of a size to permit inserting and removing said cables, and further having recesses joining said working opening of a number and of individual sizes for reception and partial encirclement of the respective cables, segmented tubular members received in said recesses encircling the respective cables therein, plug means removably fitted in said working opening, cover plate means secured to one side of said plug means and having securing portions extending into overlapping contacting relationship with said partition at locations between said recesses therein, said cover plate means having edge recesses formed complementally to said partition recesses to contact the respective segmented tubular members for holding the same in said partition recesses, and fastener means removably connecting said cover plate means to the portions of said partition overlapped thereby.

6. The removable mounting means defined in claim 5, wherein the segments of the segmented tubular members have securing elements projecting laterally therefrom into overlapping relationship with the cover plate means, and wherein the fastener means directly interconnect said securing elements respectively with the partition and the cover plate means overlapped thereby.

7. The removable mounting means defined in claim 6, wherein the segmented tubular members have internally constricted end portions defining annular chambers therebetween surrounding the respective cables received in said tubular members, and sealant injection openings formed in the walls of said tubular members for injection of sealant into said annular chambers, and wherein the securing elements for the segmented tubular members comprise generally annular flanges projecting outwardly therefrom and having a grooved face extending therearound to contact the membranous partition, each of said tubular member flanges having an opening therein extending between such groove and the annular chamber within the tubular member for passage of sealant outwardly from such chamber and into said annular groove.

References Cited in the file of this patent

UNITED STATES PATENTS

| | | |
|---|---|---|
| 1,098,775 | Wheelock | June 2, 1914 |
| 1,285,430 | Sheppy | Nov. 19, 1918 |
| 1,788,054 | Godfrey | Jan. 6, 1931 |
| 1,886,660 | Esping | Nov. 8, 1932 |
| 2,365,785 | Tinnerman | Dec. 26, 1944 |
| 2,574,142 | Buongirno | Nov. 6, 1951 |
| 2,658,699 | Rovas | Nov. 10, 1953 |